US011659031B2

(12) United States Patent
Lee et al.

(10) Patent No.: US 11,659,031 B2
(45) Date of Patent: May 23, 2023

(54) BLOCKCHAIN BASED PEER-TO-PEER CONTENT SHARING APPARATUS FOR BLOCKING ILLEGAL CONTENTS

(71) Applicant: SAMSUNG ELECTRONICS CO., LTD., Suwon-si (KR)

(72) Inventors: Sangmin Lee, Suwon-si (KR); Sangheun Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 210 days.

(21) Appl. No.: 17/121,126

(22) Filed: Dec. 14, 2020

(65) Prior Publication Data

US 2021/0211495 A1 Jul. 8, 2021

(30) Foreign Application Priority Data

Jan. 7, 2020 (KR) ........................ 10-2020-0002262

(51) Int. Cl.
*H04L 12/00* (2006.01)
*H04L 67/1087* (2022.01)
(Continued)

(52) U.S. Cl.
CPC ....... *H04L 67/1091* (2013.01); *G06Q 20/123* (2013.01); *H04L 9/0643* (2013.01); *H04L 67/108* (2013.01); *H04L 9/50* (2022.05)

(58) Field of Classification Search
CPC ............. G06Q 20/123; G06Q 20/1235; G06Q 20/02; G06Q 20/223; G06Q 2220/00;
(Continued)

(56) References Cited

U.S. PATENT DOCUMENTS 7,639,805 B2 12/2009 Li et al.
10,121,025 B1 11/2018 Rice
(Continued)

FOREIGN PATENT DOCUMENTS

CN 111159725 A * 5/2020
EP 3073670 A1 * 9/2016 ........... G06Q 20/065
(Continued)

OTHER PUBLICATIONS

Yang Y, CN110740356A, Based on the Live Data of the Monitoring Method and System of Blockchain, Jan. 2020, pp. 1-12 (Year: 2020).*

(Continued)

*Primary Examiner* — Frantz Coby
(74) *Attorney, Agent, or Firm* — Sughrue Mion, PLLC

(57) ABSTRACT

A user device configured to operate in a blockchain network includes a communicator; a memory; and a processor configured to: based on a peer-to-peer communication based content being received from at least one of a plurality of external apparatuses constituting the blockchain network, generate, through the communicator, block information related to the received content, store the generated block information in the memory, and transmit, through the communicator, the generated block information to the blockchain network; based on a user command for reporting the received content being received, transmit information on the reported content to the blockchain network; identify, based on verification on the reported content performed by at least one administrator device from among the plurality of external apparatuses, whether or not the reported content corresponds to an illegal content; and based on the reported content corresponding to the illegal content, block distribution of the received content.

10 Claims, 9 Drawing Sheets

(51) Int. Cl.
*H04L 67/1074* (2022.01)
*H04L 9/06* (2006.01)
*G06Q 20/12* (2012.01)
*H04L 9/00* (2022.01)

(58) Field of Classification Search
CPC ....... H04L 63/123; H04L 9/50; H04L 9/3239; H04L 67/1091; H04L 9/0643; H04L 67/108; H04L 9/32; G06F 21/602
USPC .......................... 713/168; 709/201, 203, 232
See application file for complete search history.

(56) References Cited

U.S. PATENT DOCUMENTS

| | | | |
|---|---|---|---|
| 2016/0283920 A1 | 9/2016 | Fisher et al. | |
| 2016/0321654 A1 | 11/2016 | Lesavich et al. | |
| 2018/0349621 A1 | 12/2018 | Schvey et al. | |
| 2019/0057115 A1 | 2/2019 | Liu et al. | |
| 2019/0258828 A1* | 8/2019 | Rice | G06F 21/602 |
| 2019/0356674 A1 | 11/2019 | Irazabal et al. | |
| 2020/0344511 A1 | 10/2020 | Cho et al. | |

FOREIGN PATENT DOCUMENTS

| | | |
|---|---|---|
| JP | 2011-28646 A | 2/2011 |
| JP | 2018-147016 A | 9/2018 |
| KR | 10-0669224 B1 | 1/2007 |
| KR | 10-1327530 B1 | 11/2013 |
| KR | 10-1868029 B1 | 6/2018 |
| KR | 10-1941785 B1 | 1/2019 |
| WO | 2019/240804 A1 | 12/2019 |

OTHER PUBLICATIONS

Written Opinion (PCT/ISA/237) issued by the International Searching Authority in International Application No. PCT/KR2020/019092, dated Mar. 26, 2021.

International Search Report (PCT/ISA/210) issued by the International Searching Authority in International Application No. PCT/KR2020/019092, dated Mar. 26, 2021.

* cited by examiner

BLOCKCHAIN BASED PEER-TO-PEER CONTENT SHARING APPARATUS FOR BLOCKING ILLEGAL CONTENTS

CROSS-REFERENCE TO RELATED APPLICATION

This application is based on and claims priority under 35 U.S.C. § 119 to Korean Patent Application No. 10-2020-0002262, filed on Jan. 7, 2020, in the Korean Intellectual Property Office, the disclosure of which is incorporated by reference herein in its entirety.

BACKGROUND

1. Field

The disclosure relates to a blockchain based peer-to-peer (P2P) content sharing network. More particularly, the disclosure relates to a user device and an administrator device operating in a blockchain based content sharing network that blocks illegal content.

2. Description of Related Art

A blockchain is a distributed computing technology in which data subject to management is distributed to and stored in a plurality of electronic apparatuses by forming a chain in a form of a small data known as a 'block.' A block cannot be modified arbitrarily regardless of the user and anyone may read the results of modification. A plurality of electronic apparatuses may be viewed as forming a blockchain network.

Content stored in the blockchain network or information on the content is difficult to delete or modify due to the characteristics of the blockchain described above. In particular, when illegal or bad content is distributed and stored in one or more electronic apparatuses, there is a risk because of the difficulty in the management or deletion of the distributed content.

With respect to blockchain based P2P streaming technology, the above-described risk becomes more problematic for the illegal/bad content which is not only distributed/shared without a central administrator, but also is impossible to delete.

SUMMARY

Provided is a method of effectively blocking illegal or bad content on a blockchain based P2P content providing network.

Also, provided is a user device which is included in the blockchain based P2P content providing network, and induces reporting or blocking by a user with respect to illegal or bad content.

Additionally, provided is an administrator device which is included in the blockchain based P2P content providing network, and effectively manages reporting or blocking with respect to content by users by verifying the illegality of the reported content.

In addition, provided is a blockchain based P2P content sharing network which includes the above-described user device and the administrator device, and effectively blocks illegal or bad content.

According to an aspect of the disclosure, a user device may be configured to operate in a blockchain network that manages block information related to shared content includes a communicator; a memory; and a processor. The processor may be configured to: based on a peer-to-peer (P2P) communication based content being received from at least one of a plurality of external apparatuses constituting the blockchain network, generate, through the communicator, block information related to the received content, store the generated block information in the memory, and transmit, through the communicator, the generated block information to the blockchain network; based on a user command for reporting the received content being received, transmit information on the reported content to the blockchain network; identify, based on verification on the reported content performed by at least one administrator device from among the plurality of external apparatuses, whether or not the reported content corresponds to an illegal content; and based on the reported content corresponding to the illegal content, block distribution of the received content.

The processor may be further configured to: store the received content in the memory; based on the user command for reporting the stored content being received, transmit information on the reported content to the blockchain network; based on block information, indicating that the reported content has been identified as the illegal content by an administrator device among the at least one administrator device, being received from the blockchain network by the communicator, delete the received content from the memory.

The processor may be further configured to, based on block information related to a compensation for the user device being received from the blockchain network corresponding to the reported content being identified as the illegal content by the at least one administrator device, store the received block information in the memory.

The processor may be further configured to: receive, through the communicator, block information related to content identified as the illegal content from the blockchain network; based on the P2P communication based content being received from at least one of the plurality of external apparatuses constituting the blockchain network, identify, through the communicator, whether or not the received content corresponds to the content identified as the illegal content; and based on the received content being identified as corresponding to the content identified as the illegal content, block distribution of the received content.

The processor may be further configured to: based on a user command agreeing to block the received content, identify whether or not the received content corresponds to content identified as the illegal content.

The processor may be further configured to: transmit, through the communicator, information on a block history of the received content to the blockchain network; and based on block information related to compensation on the user device corresponding to the block history being received from the blockchain network, store the received block information in the memory.

According to another aspect of the disclosure, An administrator device may be configured to operate in a blockchain network that manages block information related to a shared content, the administrator device may include a communicator; and a processor. The processor may be configured to: based on at least one content being reported by at least one user device of a plurality of external apparatuses constituting the blockchain network, receive, based on a P2P communication, the reported content from at least one of the plurality of external apparatuses; perform verification on the received content; and transmit information on a verification result to the blockchain network through the communicator.

The processor may be further configured to, based on information on the verification result from the administrator device and information on a verification result from a verification performed by at least one other administrator device, share block information, indicating that the reported content has been identified as an illegal content, on the blockchain network.

The processor may be further configured to, based on a number of administrator devices that identified the reported content as being the illegal content from among a plurality of administrator devices comprised in the blockchain network exceeding a predetermined number, share block information indicating that the reported content has been identified as the illegal content on the blockchain network.

The processor may be further configured to, based on information on the verification result from the administrator device and information on a verification result from a verification performed by at least one other administrator devices, share block information related to compensation for the at least one user device that reported to content on the blockchain network.

The processor may be further configured to, based on a number of administrator devices that identified the reported content as an illegal content from among a plurality of administrator devices comprised in the blockchain network exceeding a predetermined number, share block information related to the compensation for the at least one user device that reported the content on the blockchain network.

The processor may be further configured to: based on a user input identifying an illegality of the received content, obtain the verification result based on the user input.

The administrator device may further include a memory storing an artificial intelligence model trained to identify the illegality of content. The processor may be further configured to, based on the received content being input into the artificial intelligence model, obtain the verification result based on information on an illegality of the content obtained from the artificial intelligence model.

The communicator may be connected to a server device storing an artificial intelligence model trained to identify illegality of content. The processor may be further configured to: based on the reported content being received, transmit the received content to the server device through the communicator; based on receiving, from the server device, information on illegality of the content provided by the artificial intelligence model, obtain the verification result based on the information on the illegality obtained through the artificial intelligence model.

According to another aspect of the disclosure, A content sharing system may include a plurality of electronic apparatuses sharing content through P2P communication. The plurality of electronic apparatuses may constitute a blockchain network which manages block information related to content shared by the plurality of electronic apparatuses. The plurality of electronic apparatuses may include a user device configured to receive content through the P2P communication from at least one of the plurality of electronic apparatuses, and transmit information on the received content to the blockchain network based on a user command reporting the received content; and an administrator device. The administrative device may be configured to: receive the content from the user device; based on the information on the content transmitted to the blockchain network, perform verification on the received content; and transmit information on the performed verification result to the blockchain network. The blockchain network may generate block information related to compensation for the user device based on information on the verification result.

BRIEF DESCRIPTION OF THE DRAWINGS

The above and other aspects and features of certain embodiments of the present disclosure will be more apparent from the following detailed description, taken in conjunction with the accompanying drawings, in which.

DETAILED DESCRIPTION

Figure 1:
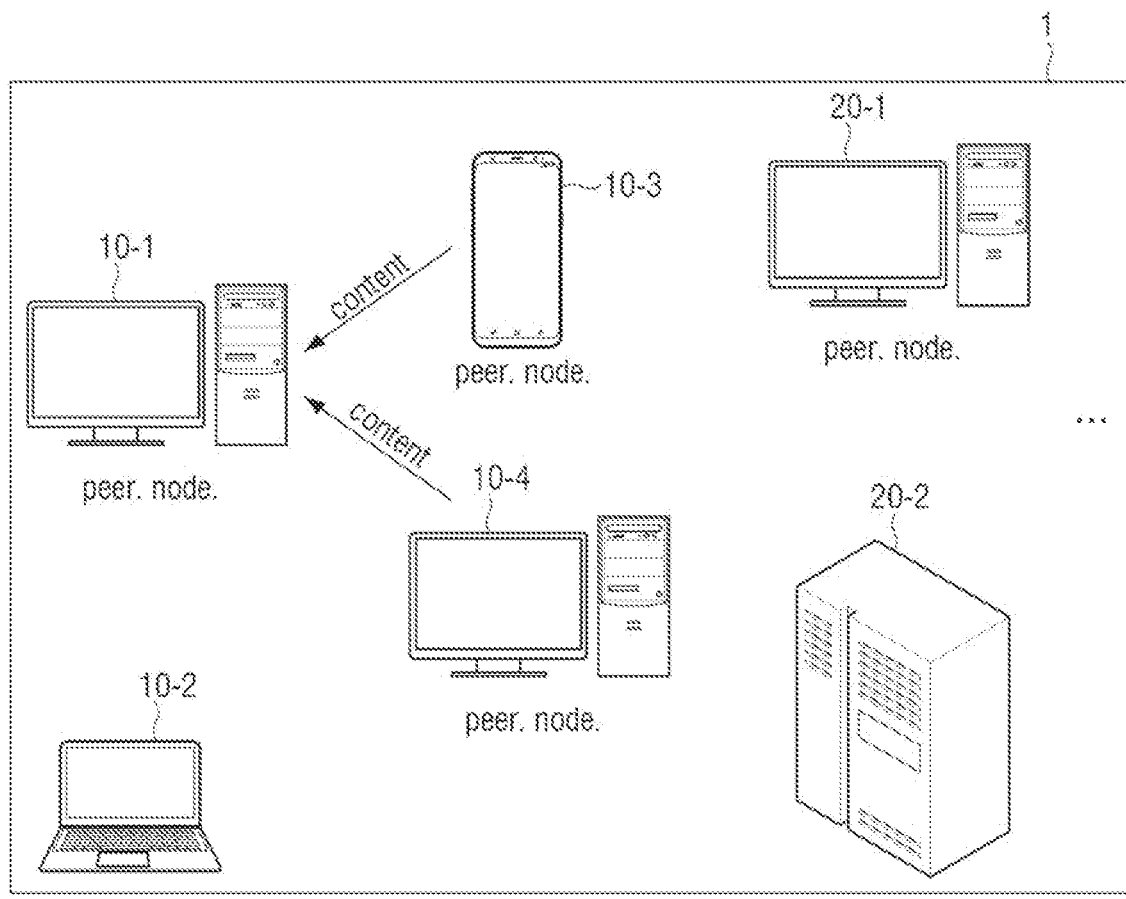
FIG. 1 is a schematic diagram showing a blockchain based P2P content sharing network, according to an embodiment.

The embodiments described below are exemplary embodiments for promoting understanding of the disclosure, and it should be noted that the disclosure may be implemented while being modified in various forms, unlike the embodiments described herein. Meanwhile, in explaining the disclosure below, in case it is determined that detailed explanation of related known functions or components may unnecessarily confuse the gist of the disclosure, the detailed explanation and detailed illustration will be omitted. Also, in the accompanying drawings, some components may not be illustrated according to their actual sizes but they may be illustrated in exaggerated sizes, for promoting understanding of the disclosure.

The terms used in the disclosure are general terms identified in consideration of the functions of the various example embodiments of the disclosure. However, these terms may vary depending on intention, legal or technical interpretation, emergence of new technologies, and the like of those skilled in the related field of art. Also, there may be some arbitrary terms. Unless there is a specific definition of a term, the term may be construed based on the overall contents and technological common sense of those skilled in the related art.

In addition, like reference numerals or symbols indicate like components or elements that perform substantially the same functions throughout the disclosure. For convenience of descriptions and understanding, the same reference numerals or symbols are used and described in different example embodiments. In other words, although elements having the same reference numerals are all illustrated in a plurality of drawings, the plurality of drawings may not refer to only one embodiment.

In addition, the terms including ordinal numbers such as "first," "second," and the like may be used to differentiate between elements in the disclosure. The ordinal numbers are used to distinguish same or similar elements from another, and should not be understood as limiting the meaning of the terms as a result of using these ordinal numbers. For example, the elements associated with the ordinal numbers should not be limited in the order of use, order of arrangement, or the like by the numbers. If necessary, each of the ordinal numbers may be interchangeably used.

A singular expression in the disclosure includes a plural expression, unless otherwise specified clearly in context. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

In the example embodiments of the disclosure, terms such as "module," "unit," "part", and so on may be used to refer to an element that performs at least one function or operation, and such element may be implemented as hardware or software, or a combination of hardware and software. Further, except for when each of a plurality of "modules", "units", "parts", and the like needs to be implemented in an individual hardware, the components may be integrated in at least one module or chip and be implemented in at least one processor.

In addition, in the various example embodiments described herein, when any part is indicated as following another part, this includes not only a direct connection, but also an indirect connection through another medium. Further, when a certain part includes a certain element, unless specified to the contrary, another element may be additionally included, rather than precluding another element.

The various embodiments of the disclosure will be described in detail below using the accompanying drawings.

FIG. 1 is a schematic diagram showing a blockchain based P2P content sharing network.

Referring to FIG. 1, the P2P communication based content sharing system 1, according to an embodiment, may include a plurality of user devices 10-1, 10-2, 10-3, 10-4 and a plurality of administrator devices 20-1, 20-2.

A user device may be a terminal device sharing content with other user devices on the sharing system 1.

An administrator device may be a device for verifying or agreeing on at least a portion of the block information including a block on the sharing system 1, which operates based on the blockchain.

The plurality of user devices 10-1, 10-2, 10-3, 10-4 and the plurality of administrator devices 20-1, 20-2 may each operate as a 'peer' for P2P communication, and may share at least a portion of the content. To this end, in each of the plurality of user devices 10-1, 10-2, 10-3, 10-4 and the plurality of administrator devices 20-1, 20-2, an application for P2P communication based sharing may be installed.

For example, referring to FIG. 1, the user device 10-1 may receive a content packet including 'content' from each of the user devices 10-3 and 10-4 including at least a portion of the 'content.'

The user device 10-1 may receive the content packet by requesting 'content' from user devices 10-3 and 10-4. Although not shown in FIG. 1, a separate server device storing an identification number of 'content' which may be shared on the sharing system 1, a website address to which devices may connect for transmitting and receiving 'content' between devices, and the like may be present.

Through the content sharing system 1 of FIG. 1, real-time streaming service may also be possible between the devices included in the system 1.

The sharing system 1 illustrated in FIG. 1, may include a blockchain network that manages block information related to content.

Blockchain network may be a system in which a plurality of apparatuses distribute and hold data, generate a block at a predetermined time basis, and operate on a verifying method by each of the devices. The blockchain network may include a blockchain application and a platform.

In each of the devices of FIG. 1, a blockchain application may be installed to use the blockchain network.

One device comprised in the blockchain network transmitting or uploading block information to the blockchain network may refer to block information being recorded to a public ledger (block) made public at predetermined time intervals (e.g., 10 minutes) on the blockchain network to which a plurality of electronic apparatuses are connected.

Specifically, details of transmission of content between the electronic apparatuses, information on content transmitted and received between electronic apparatuses (e.g., content, identification number of content, whether or not the content is illegal/bad, etc.), property (e.g., virtual money on the blockchain network) vested in each of the electronic apparatuses (e.g., users of the electronic apparatuses), property transaction details between users of each of the electronic apparatuses (e.g., users of the electronic apparatuses), information related to compensation of blockchain network with respect to each of the electronic apparatuses (e.g., users of the electronic apparatuses), or the like may be stored in the block as block information on the content sharing system 1.

In addition, information on a reported content, information on an electronic apparatus that reported the content, information on the content indicating illegal/bad content, or the like may be stored in the block as block information, which will be described below.

For example, based on content being provided from one user device to other user devices on the content sharing system 1, a blockchain network may be designed for a transaction of transferring property from user devices receiving content to the user device providing content to be performed.

Alternatively, the blockchain network may be designed for compensation (e.g., virtual money) to be provided to the user device providing content to one or more user devices.

However, the blockchain network of the content sharing system 1 may be variously designed to encourage content sharing in addition to the above.

With respect to the above-describe content sharing system 1, there is a risk of being exposed to illegal/bad content.

A user device 100 and an administrator device 200 capable of blocking illegal/bad content based on blockchain, on the above-described content sharing system 1, will be described in greater detail below through the accompanied drawings.

Figure 2:
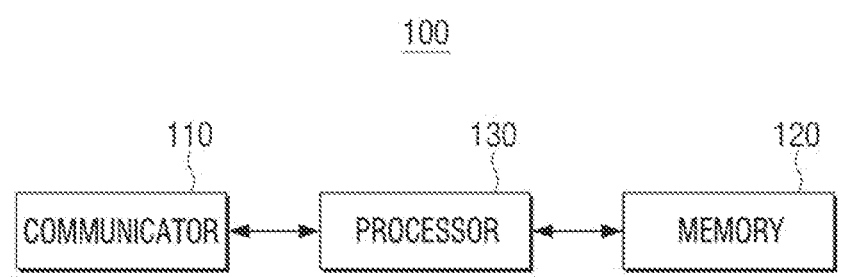
FIG. 2 is a block diagram showing a configuration of a user device, according to an embodiment.

FIG. 2 is a block diagram showing a configuration of a user device according to an embodiment. Referring to FIG. 2, the user device 100 may include a communicator 110, a memory 120, and a processor 130.

The user device 100 may be included in the blockchain network which manages block information related to the shared content. The user device 100 may refer to various terminal devices capable of providing content such as, for example, and without limitation, a desktop personal computer (PC), a notebook PC, a tablet PC, a smartphone, a set-top box, a console device, or the like.

The communicator 110 may be directly or indirectly connect with the external electronic apparatus based on a network realized through wired communication and/or wireless communication. The user device 100 may be connected with at least one from among the plurality of external apparatuses included in the blockchain network through the communicator 110.

The network may be a personal area network (PAN), a local area network (LAN), a wide area network (WAN), or the like according to an area or scale, and an intranet, an extranet, an internet, or the like based on the openness of the network.

The wireless communication herein may include at least one from among communication methods such as, for example, and without limitation long-term evolution (LTE), LTE Advance (LTE-A), 5th generation (5G) mobile communication, code division multiple access (CDMA), wideband CDMA (WCDMA), universal mobile telecommunications system (UMTS), wireless broadband (WiBro), global system for mobile communications (GSM), time division multiple access (DMA), WiFi (Wi-Fi), WiFi Direct, Bluetooth, near field communication (NFC), ZigBee, or the like.

The wired communication herein may include at least one from among communication methods such as, for example, and without limitation, Ethernet, optical network, universal serial bus (USB), ThunderBolt, or the like. The communicator 110 may include a network interface or a network chip according to the above-described wired or wireless communication method. The communication method is not limited to the above-described examples, and may include a newly appearing communication method according to development of technologies.

The memory 120 may be a configuration for storing an operating system (OS) for controlling the overall operation of elements of the user device 100 and at least one instruction or data related to an element of the user device 100.

The processor 130 may perform an operation according to the various embodiments which will be described below by executing at least one instruction stored in the memory 120.

The memory 120 may include non-volatile memory such as a read only memory (ROM) and a flash memory, and a volatile memory comprised of a DRAM, and the like. In addition, the memory 120 may also include a storage comprised of a hard disk, a solid state drive (SSD), and the like.

Various block information comprising the block shared on the blockchain network may be stored in the memory 120. In addition, an application for sharing content with one or more external electronic apparatuses on the content sharing system 1, an application for sharing block information with one or more external electronic apparatuses on the blockchain network, and the like may be stored in the memory 120.

The processor 130 may control the overall operation of the electronic apparatus 100.

The processor 130 according to an embodiment may be implemented as a digital signal processor (DSP), a microprocessor, or a time controller (TCON). However, the embodiment is not limited thereto, and the processor 130 may include one or more from among a central processing unit (CPU), a micro controller unit (MCU), a micro processing unit (MPU), a controller, an application processor (AP), a communication processor (CP), or a ARM processor, or may be defined by the corresponding term. In addition, the processor 130 may be implemented as a system on chip (SoC), large scale integration (LSI) embedded with a processing algorithm, or in the form of a field programmable gate array (FPGA).

The processor 130 may be implemented as a graphics dedicated processor such as a graphics processing unit (GPU) and a vision processing unit (VPU), an artificial intelligence dedicated processor such as a neural processing unit (NPU), or the like.

The processor 130 may include a volatile memory such as a static RAM (SRAM).

Regarding FIGS. 3 and 4, the specific operation of the user device 100 including the above-described configuration will be described.

Figure 3:
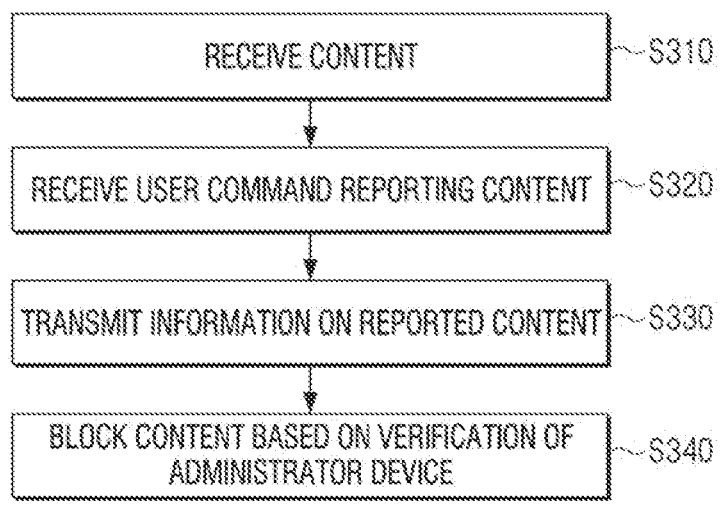
FIG. 3 is a flowchart of a method of transmitting, by a user device, information on a reported content to a network, according to an embodiment.

FIG. 3 is a flowchart of a method of transmitting, by a user device, information on a reported content to a network according to an embodiment.

Referring to FIG. 3, the user device 100 may receive content from the blockchain network (e.g., content sharing system) (operation S310).

The user device 100 may, through the communicator 110, receive content based on P2P communication from at least one from among a plurality of external apparatuses which comprise the blockchain network. The blockchain network may include a plurality of external apparatuses and a user device 100.

Specifically, the processor 130 may execute the P2P communication based content sharing application, and the like, stored in the memory 120 and transmit a request of the content to the blockchain network. Accordingly, a content packet may be received from at least one external apparatus from among the plurality of external apparatuses. The request of the content may be transmitted according to a user command received by the user device 100.

Based on receiving the content, the processor 130 may store the received content in the memory 120.

Based on content being received, the processor 130 may generate block information related to the received content, store the block in the memory 120, and transmit the generated block information to the blockchain network through the communicator 110.

The block information related to the received content may include transmission details of content, information on the devices that provided/received content, identification number of the content, information related to compensation for at least one device based on the providing/receiving of content, or the like.

The processor 130 may provide the received content (e.g., content stored in the memory 120) to the user. Specifically, the processor 130 may provide received content through a display and/or audio output module (e.g., speaker, headphone/earphone jack, etc.), or the like, of the user device 100 in a visual or audible manner. The processor 130 may be configured to control the communicator 110 to transmit the received content to an external user device such as a wireless earphone and TV.

The user device 100 may receive the user command for reporting the received content (S320). Specifically, through a user input module (e.g., touch screen, button, microphone, etc.) provided in the user device 100, a user command for reporting the corresponding content, due to the corresponding content corresponding to illegal content, may be received. The illegal content may refer to content with inflammatory content such as pornography, content with heavy violence, unethical content, other inhumane content, or the like. However, illegal content is not limited to these specific types of content and may be determined based on the situation.

The processor 130 may transmit information on the reported content to the blockchain network (S330). The processor 130 may share the identification number of the reported content or the like on the blockchain network.

The processor 130 may then block the corresponding content based on verification by the administrator device (S340).

Specifically, the processor 130 may, based on verification on the reported content performed by at least one administrator device from among the plurality of external apparatuses comprised in the blockchain network, identify whether the reported content corresponds to illegal content.

The administrator device may be a device for identifying and agreeing on the illegality of content shared on the blockchain network. The administrator device may, based on information on the reported content shared on the blockchain network by the processor 130, verify the reported content. Then, based on the reported content being identified as illegal content by the administrator device, the block information indicating that the reported content has been identified as illegal content may be shared on the blockchain network. A more detailed description on the administrator device will be described below through FIGS. 5 to 6.

Accordingly, based on the reported content being identified as illegal content based on block information or the like indicating that the reported content has been identified as illegal content, the processor 130 may block the distribution of the received content.

That is, the processor 130 may block at least a portion of the corresponding content from being distributed from the user device 100 to other devices on the blockchain network. In addition, the processor 130 may control the user device 100 so that the corresponding content is not provided to a user through the user device 100.

For example, based on a block information indicating that the reported content has been determined as illegal content by an administrator device being received from the blockchain network through the communicator 110, the processor 130 may delete the received content from the memory 120.

The processor 130 may also block the distribution of content based on the user command. Specifically, only when a user command agreeing to blocking the distribution of illegal content is received, the processor 130 may block the distribution of the content identified as illegal content.

Based on the block information indicating that the reported content has been identified as illegal content being shared on the blockchain network, a block information related to compensation of the user device 100 that reported the corresponding content may be generated on the blockchain network.

Based on block information related to compensation for the user device 100 being received from the blockchain network, the processor 130 may store the received block information in the memory 120.

The user device 100 comprising the blockchain network according to an embodiment may, based on a report being received on at least one from among the contents shared through the blockchain network, have the effect of blocking additional distribution of the corresponding content according to the verification result of the reported content. Further, because compensation may be provided to the user device from which the report has been received if the reported content is an illegal content, a content movement proactively participated by users may be encouraged.

Based on block information related to the content identified as illegal content being shared, even if the repot is not directly received through the user device 100, the user device 100 may observe whether or not illegal content is received in the user device 100.

Figure 4:
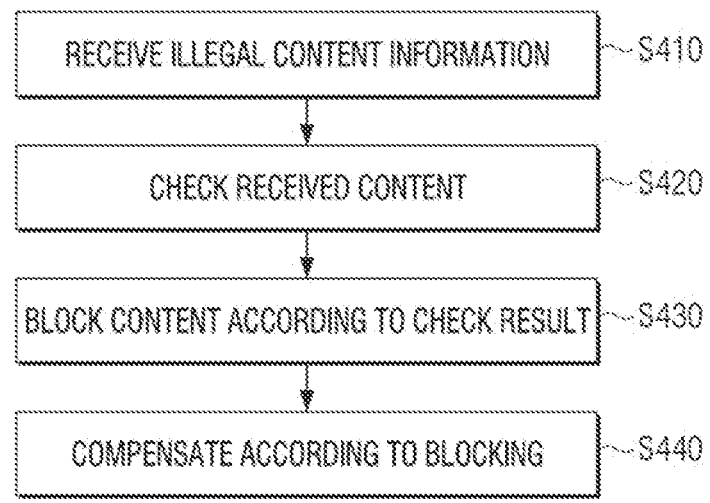
FIG. 4 is a flowchart of a method of observing, by a user device, received content based on information related to the content being indicated as illegal, according to an embodiment.

FIG. 4 is a flowchart showing a method of observing, by a user device, received content based on information related to the received content indicating the content is illegal according to an embodiment.

Referring to FIG. 4, block information related to content identified as illegal content may be received from the blockchain network through the communicator 110 (S410). The content identified as illegal content may be content identified as illegal content according to the verification result performed by one or more administrator devices.

The block information related to illegal content may include an identification number of the illegal content and information on a website address to which a device may connected to provide/receive the illegal content, or the like, but the embodiment is not limited thereto.

Based on content being received based on P2P communication from at least one from among the plurality of external apparatuses comprising the blockchain network through the communicator 110, the processor 130 may be configured to inspect whether or not the received content is an illegal content (operation S420).

The processor may, based on the block information received in S410, identify whether the received content corresponds to content identified as illegal content.

Based on the received content being identified as corresponding to the content identified as illegal content, the processor 130 may block the distribution of the received content (operation S430).

The processor 130 may, through the communicator 110, transmit information on the block history of the content in the user device 100 to the blockchain network. The information on the block history of content may include information on history of illegal content distribution being blocked from transferring between the user device 100 and other external apparatuses, number of times provision of illegal content has been blocked on the user device 100, history of illegal content received in the user device 100 being deleted, or the like, but the embodiment is not limited thereto.

In this case, based on the block history on the illegal content in the user device 100, block information related to compensation of the user device 100 may be generated and shared on the blockchain network. The block information related to compensation of the user device 100 may be generated and shared according to verification/agreement by one or more administrator devices on the block history.

Accordingly, compensation may be provided to the user of the user device 100 (operation S440). Specifically, based on block information related to compensation for the user device 100 according to a block history being received, the processor 130 may store the received block information in the memory 120.

The processor 130 may, only when a user command agreeing to the blocking of the illegal content is received, perform checking on whether or not the received content is an illegal content (operation S420) and blocking on the distribution of illegal content (operation S430).

As described above, through the user device 100 on the blockchain network, because compensation is provided to users blocking additional distribution of content identified as illegal content, a clean content movement may be encouraged.

Figure 5:
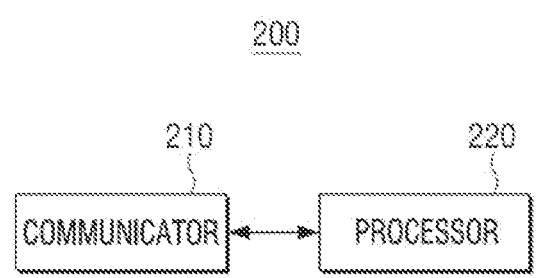
FIG. 5 is a block diagram showing a configuration of an administrator device according to an embodiment.

FIG. 5 is a block diagram showing a configuration of an administrator device according to an embodiment.

Referring to FIG. 5, the administrator device 200 may include a communicator 210 and a processor 220. As described above, the administrator device 200 may be a device to identify and agree on the illegality of the content shared on the blockchain network.

The administrator device 200 may be comprised of various terminal devices or implemented as a server device. In addition, the administrator device 200 may be implemented as a terminal device connected to one or more server devices through the communicator 210.

Figure 6:
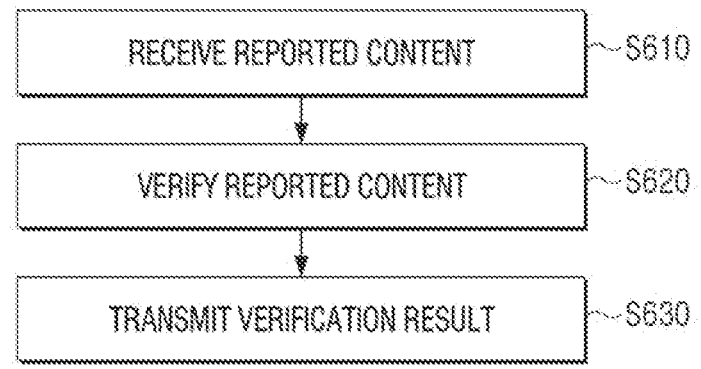
FIG. 6 is a flowchart showing an example of an administrator device operating to verify the reported content according to an embodiment.

FIG. 6 is a flowchart showing an example of the administrator device operating to verify the reported content according to an embodiment.

Referring to FIG. 6, the administrator device 200 may receive the reported content through the communicator 210 (operation S610).

Specifically, based on at least one content being reported by at least one from among the plurality of external devices comprising the blockchain network, the processor 220 may be configured to control the communicator 210 to receive the reported content from at least one from among the plurality of external apparatuses based on P2P communication. To this end, the processor 220 may be configured to control the communicator 210 to request a content packet on the reported content to the blockchain network (e.g., content sharing system).

The processor 220 may then perform verification on the received content (operation S620). The processor 220 may identify whether or not the received content is an illegal content. Accordingly, the processor 220 may obtain the verification result (e.g., identification result on whether or not the content is an illegal content) on the reported content.

For example, the processor 220 may, based on the reported content being received, provide the received content to the user of the administrator device 200 in a visual or auditory manner. Then, based on a user input identifying the illegality of the provided content being received, the result of verification based on the user input may be obtained.

Based on a user input on the corresponding content being an illegal content being received, the processor 220 may obtain the verification result that the corresponding content has been identified as illegal content.

In another embodiment, the administrator device 200 may verify the content by using technology such as an automatic content recognition (ACR).

For example, a trained artificial intelligence model may be stored in the memory of the administrator device 200 to identify illegality of content. The processor 220 may obtain the verification result based on information on the illegality of the obtained content according to the received content being input to the artificial intelligence model.

The information on the illegality may be defined according to an output of the artificial intelligence model. For example, information on illegality may be information on whether or not the input content corresponds to illegal content, a likelihood that the input content may correspond to illegal content, or the like, but the embodiment is not limited thereto.

The artificial intelligence model may be trained based on learning data comprised of content such as an image, a video, music, or the like, and may be implemented as a trained classifier to identify (e.g., classify) whether or not the input content is illegal content. In addition, the artificial intelligence model may be implemented as a neural network model comprised of a plurality of layers.

For example, based on at least one image frame included in the content including videos being input into the artificial intelligence model, the artificial intelligence model may output information on whether or not the image frame input to the artificial intelligence model is the image frame of illegal content. The artificial intelligence model may include a layer trained to identify an object included in an image frame, a layer trained to identify a color of the image frame, or the like, but the embodiment is not limited thereto.

In addition, the processor 220 may obtain a text by recognizing (e.g., automatic sound recognition (ASR)) an audio signal included in a content comprised of videos, and verify whether or not the corresponding content is an illegal content based on the obtained text.

When the communicator 210 of the administrator device 200 is connected to a separate server device, the administrator device 200 may obtain a verification result performed through the service device.

Figure 7:
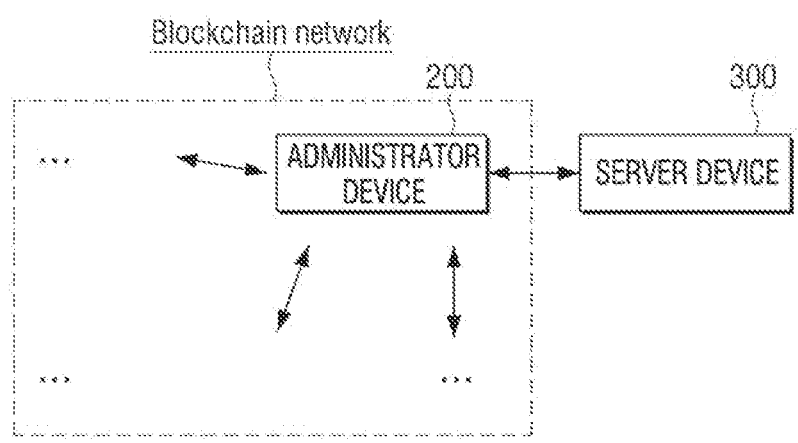
FIG. 7 is a block diagram showing an administrator device operating to verify content reported through communication with a server device according to an embodiment.

FIG. 7 is a block diagram showing examples of an administrator device operating to verify content reported through communication with a server device according to an embodiment.

Referring to FIG. 7, the administrator device 200 included in the blockchain network may be connected with the server device 300. The server device 300 may not be included in the blockchain network. In the server device 300, an artificial intelligence model may be stored to identify the illegality of content.

For example, based on information on the content reported to the administrator device 200 being received from the blockchain network, the administrator device 200 may receive the corresponding content from the at least one electronic apparatus included in the blockchain network. The administrator device 200 may transmit the received content to the server device 300.

Alternatively, the server device 300 which received the information on the corresponding content from the administrator device 200 may directly receive the content from the at least one electronic apparatus included in the blockchain network.

Then, based on information on the illegality of the reported content being received from the server device 300, the processor 130 may obtain the verification result based on information received on illegality.

The server device 300 may, by using an automatic content recognition (ACR) or at least one artificial intelligence model, obtain information (e.g., whether or not the content corresponds to illegal content, etc.) on the illegality of the reported content by verifying the reported content.

Then, the information on the illegality of the content obtained through the server device 300 may be transmitted from the server device 300 to the administrator device 200.

The administrator device 200 and the server device 300 may also respectively perform verification on the reported content. For example, verification may be performed primarily by the administrator device 200, and then verification may be performed secondarily by the server device 300.

For example, based on the reported content being identified as illegal content according to a primary verification by the administrator device 200, the server device 300 may perform a secondary verification. Based on the reported content being identified as illegal content even according to the secondary verification by the server device 300, the administrator device 200 may obtain the verification result that the reported content has been identified as illegal content. On the other hand, based on the primary verification or the secondary verification, if the reported content is identified a not being an illegal content, the administrator device 200 may obtain the verification result that the reported content has been identified as not an illegal content.

Based on a verification result being obtained through the various embodiments described above, the processor 220 may transmit information on the verification result to the blockchain network through the communicator 210 (operation S630).

At this time, in addition to the information on the verification result performed by the administrator device 200 (and/or server device 300), information on the verification result performed by other administrator devices included on the blockchain network may also be shared on the blockchain network.

Based on information on the verification result performed by the administrator device 200 and information on the verification result performed by each of the other administrator devices, a block information indicating that the reported content has been identified as an illegal content may be shared on the blockchain network.

Specifically, when the number of administrator devices that identified (e.g., result of performed verification) the reported content as illegal content exceeds a predetermined number from among the plurality of administrator devices included in the blockchain network, block information indicating that the reported content has been identified as illegal content may be shared on the blockchain network. The predetermined number may, for example, be a majority, but is not limited thereto.

When the number of administrator devices that identified (e.g., result of performed verification) the reported content as illegal content exceeds a predetermined number from among the plurality of administrator devices included in the blockchain network, a secondary verification being performed on the reported content through the server device connected with the at least one administrator device may also be possible. At this time, when the reported content is identified as illegal content even by the secondary verification, block information indicating that the reported content has been identified as illegal content may be shared on the blockchain network.

As described above, verification on the reported content may not only be performed by each of the plurality of administrator devices (and/or at least one server device), but because block information is generated based on an agreement on the result of verification performed by each of the plurality of administrator devices, reliability of block information related to the illegal content on the blockchain network may be guaranteed. Further, harmful effects based on meaningless reporting or false reporting may be prevented.

Based on information on the verification result performed by the administrator device 200 and information on the verification result performed by each of the other administrator devices, block information related to compensation for the user device that reported the content from among the plurality of external apparatuses may be shared on the blockchain network.

Specifically, based on the number of administrator device that determined the reported content as illegal content from among the plurality of administrator devices included in the blockchain network exceeding a predetermined number, block information related to compensation for the user device that reported the corresponding content from among the plurality of external apparatuses may be shared on the blockchain network.

Figure 8:
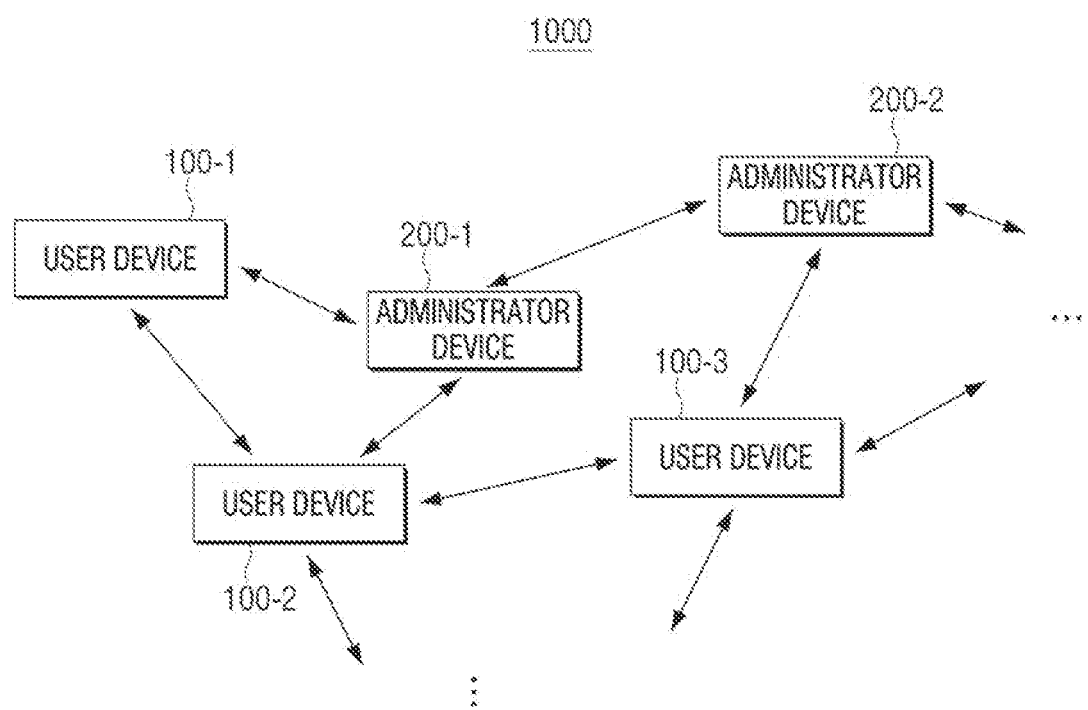
FIG. 8 is a block diagram showing a blockchain based content sharing system including the user device and the administrator device.

FIG. 8 is a block diagram showing a blockchain based content sharing system (e.g., blockchain network) including the user device and the administrator device shown and described through the above-described drawings.

Referring to FIG. 8, the sharing system 1000 may include a plurality of user devices 100-1, 100-2, 100-3 . . . and a plurality of administrator devices 200-1, 200-2 . . . . The each of the plurality of user devices 100-1, 100-2, 100-3 . . . may correspond to the user device 100 described through FIGS. 2 to 4. In addition, the each of the plurality of administrator devices 200-1, 200-2 . . . may correspond to the administrator device 200 described through FIGS. 5 to 6.

Each of the plurality of user devices 100-1, 100-2, 100-3 . . . and each of the plurality of administrator devices 200-1, 200-2 . . . may operate as a peer of a P2P communication based content sharing system and/or a node on the blockchain network.

Figure 9:
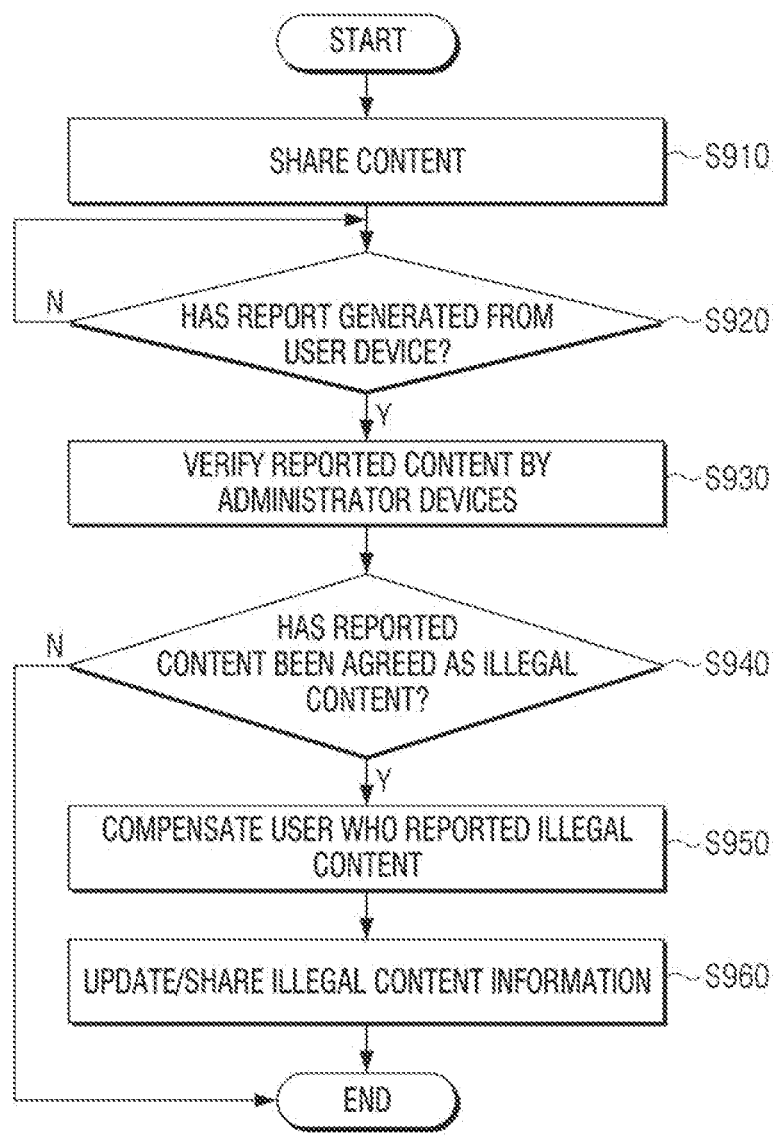
FIG. 9 is a flowchart of an operation of a content sharing system according to an embodiment.

FIG. 9 is a flowchart showing an operation of the content sharing system of FIG. 8.

Referring to FIG. 9, various content may be shared through the plurality of electronic apparatuses on the content sharing system 1000 (operation S910). The plurality of electronic apparatuses may share various content based on P2P communication.

However, if a report on one content has been generated from a user device included in the system 1000 (operation S920-Y), information on the reported content may be shared on the system 1000.

The administrator devices included in the system 1000 may verify the reported content (operation S930). For example, the each of the administrator devices may receive the reported content from one or more electronic apparatuses included in the system 1000, and identify whether or not the reported content is an illegal content. At this time, at least one from among the administrator devices may, based on the verification result performed through a separate server device, identify whether or not the reported content is an illegal content.

If the reported content is agreed upon as illegal content by the administrator devices (operation S940), block information related to compensation for the user device that performed the reporting may be generated and shared on the system 1000 (operation S950). The reported content being agreed upon as illegal content may refer to the administrator device of a predetermined number or more from among the administrator devices identifying the reported content as illegal content.

In addition, block information indicating that the reported content corresponds to illegal content may be generated and shared on the system 1000 (operation S960). In this case, each of the user devices on the system 1000 may identify whether the content received in each of the user devices is illegal content or not based on the shared block information. The reported content being agreed upon as illegal content may refer to If the content received in one user device is identified as an illegal content, the corresponding user device may block the additional distribution of illegal content. In this case, block information related to compensation for the user device which blocked the illegal content may be generated and shared on the system 1000.

The various operations described as being performed through at least one from among the user device 100, the administrator device 200, and the content sharing system 1000 above may be performed through one or more electronic apparatuses in the form of a control method or an operation method of the blockchain network.

The user device (user apparatus) included in the blockchain network may encourage reports by users on the received content, and block the distribution or provision of illegal content based on information on the illegal content shared on the blockchain network.

The administrator device included in the blockchain network may rationally verify the report by the user on illegal content, and wholesomely manages the content sharing environment on the blockchain network by sharing information on illegal content based on the verified results.

The blockchain network according to an embodiment has the effect of inhibiting distribution and diffusion of illegal or bad content by encouraging a clean content movement proactively participated by users in a P2P content sharing environment in which content is distributed without a central administer.

The above-described example embodiments may be implemented within a recording medium capable of being read by a computer or a device similar thereto by using a software, a hardware, or a combination of the software and the hardware.

According to a hardware implementation, the example embodiments described herein may be implemented by using at least one from among application specific integrated circuits (ASICs), digital signal processors (DSPs), digital signal processing devices (DSPDs), programmable logic devices (PLDs), field programmable gate arrays (FPGAs), a processor, a controller, micro-controllers, a microprocessor, and an electrical unit for performing other functions.

In some cases, the example embodiments described herein may be implemented by the processor itself. According to a software implementation, embodiments such as the processes and functions described herein may be implemented with separate software modules. Each of the software modules described may perform one or more of the functions and operations described herein.

The computer instructions for performing processing operations of the user device or the administrator device according to the various embodiments described above may be stored in a non-transitory computer-readable medium. The computer instructions stored in this non-transitory computer-readable medium may cause a specific device to perform the processing operations of the user device and/or the administrator device according to the various embodiments described above when executed by the processor of a specific device.

The non-transitory computer readable medium refers to a medium that stores data semi-permanently rather than storing data for a very short time, such as a register, a cache, a memory or the like, and is readable by a device. Specifically, the various applications or programs described above may be stored and provided in a non-transitory computer readable medium such as, for example, and without limitation, a compact disc (CD), a digital versatile disc (DVD), a hard disc, a Blu-ray disc, a universal serial bus (USB), a memory card, a read only memory (ROM), and the like.

While the present disclosure has been illustrated and described with reference to various example embodiments thereof, the present disclosure is not limited to the specific embodiments described. It will be understood by those skilled in the art that various changes in form and details may be made therein without departing from the spirit and scope of the disclosure.

What is claimed is:

1. A user device configured to operate in a blockchain network that manages block information related to shared content, the user device comprising:
   a communicator;
   a memory; and
   a processor configured to, based on a peer-to-peer (P2P) communication based content being received from at least one of a plurality of external apparatuses constituting the blockchain network, generate, through the communicator, block information related to the received content, store the generated block information in the memory, and transmit, through the communicator, the generated block information to the blockchain network;
   wherein the processor is configured to:
      based on a user command for reporting the received content being received, transmit information on the reported content to the blockchain network;
      identify, based on verification on the reported content performed by at least one administrator device from among the plurality of external apparatuses, whether or not the reported content corresponds to an illegal content; and
      based on the reported content corresponding to the illegal content, block distribution of the received content,
   wherein the processor is further configured to:
      receive, through the communicator, block information related to content identified as the illegal content from the blockchain network;
      transmit, through the communicator, information on a block history of the received content to the blockchain network; and
      based on block information related to compensation on the user device corresponding to the block history being received from the blockchain network, store the received block information in the memory,
      wherein based on a number of administrator devices that identified the reported content as illegal content exceeding a predetermined number from among a plurality of administrator devices included in the blockchain network, a secondary verification is performed on the reported content through a server device connected with the at least one administrator device,
      wherein the block information related to the received content comprises transmission details of the content, information on devices providing or receiving the content, identification number of the content, information related to compensation for at least one device, and
      wherein the information on the block history of the received content comprises information on history of illegal content distribution being blocked from transferring between the user device and other external apparatuses, number of times provision of illegal content has been blocked on the user device and history of illegal content received in the user device being deleted.

2. The user device of claim 1, wherein the processor is further configured to:
   store the received content in the memory;
   based on the user command for reporting the stored content being received, transmit information on the reported content to the blockchain network; and
   based on block information, indicating that the reported content has been identified as the illegal content by an administrator device among the at least one administrator device, being received from the blockchain network by the communicator, delete the received content from the memory.

3. The user device of claim 1, wherein the processor is further configured to, based on the block information related to the compensation for the user device being received from the blockchain network corresponding to the reported content being identified as the illegal content by the at least one administrator device, store the received block information in the memory.

4. The user device of claim 1, wherein the processor is further configured to:
  receive, through the communicator, block information related to content identified as the illegal content from the blockchain network;
  based on the P2P communication based content being received from at least one of the plurality of external apparatuses constituting the blockchain network, identify, through the communicator, whether or not the received content corresponds to the content identified as the illegal content; and
  based on the received content being identified as corresponding to the content identified as the illegal content, block distribution of the received content.

5. The user device of claim 4, wherein the processor is further configured to:
  based on a user command agreeing to block the received content, identify whether or not the received content corresponds to content identified as the illegal content.

6. The user device of claim 1, wherein the at least one administrator device obtains information on the illegality of the reported content by verifying the reported content using an automatic content recognition (ACR).

7. The user device of claim 1, wherein information on the verification result performed by other administrator devices included on the blockchain network is shared on the blockchain network in addition to the information on the verification result performed by the at least one administrator device.

8. A content sharing system comprising a plurality of electronic apparatuses sharing content through P2P communication, wherein the plurality of electronic apparatuses constitutes a blockchain network which manages block information related to content shared by the plurality of electronic apparatuses,
  the plurality of electronic apparatuses comprising:
    a user device configured to receive content through the P2P communication from at least one of the plurality of electronic apparatuses, and transmit information on the received content to the blockchain network based on a user command reporting the received content; and
    at least one administrator device configured to:
      receive the content from the user device;
      based on the information on the content transmitted to the blockchain network, perform verification on the received content; and
      transmit information on the performed verification result to the blockchain network,
    wherein the blockchain network generates block information related to compensation for the user device based on information on the verification result,
    wherein the user device is further configured to:
      receive block information related to content identified as the illegal content from the blockchain network;
      transmit information on a block history of the received content to the blockchain network; and
      based on the block information related to the compensation for the user device corresponding to the block history being received from the blockchain network, store the received block information in the memory,
    wherein based on a number of administrator devices that identified the reported content as illegal content exceeding a predetermined number from among a plurality of administrator devices included in the blockchain network, a secondary verification is performed on the reported content through a server device connected with the at least one administrator device,
    wherein the block information related to the received content comprises transmission details of the content, information on devices providing or receiving the content, identification number of the content, information related to compensation for at least one device, and
    wherein the information on the block history of the received content comprises information on history of illegal content distribution being blocked from transferring between the user device and other external apparatuses, number of times provision of illegal content has been blocked on the user device and history of illegal content received in the user device being deleted.

9. The content sharing system of claim 8, wherein the at least one administrator device obtain information on the illegality of the reported content by verifying the reported content using an automatic content recognition (ACR).

10. The content sharing system of claim 8, wherein information on the verification result performed by other administrator devices included on the blockchain network is shared on the blockchain network in addition to the information on the verification result performed by the at least one administrator device.

* * * * *